United States Patent [19]

Sugimoto et al.

[11] Patent Number: 5,700,074
[45] Date of Patent: Dec. 23, 1997

[54] BRAKING FORCE DISTRIBUTION CONTROL SYSTEM FOR VEHICLE

[75] Inventors: Yoichi Sugimoto; Yoshihiro Urai; Shohei Matsuda, all of Wako, Japan

[73] Assignee: Honda Giken Kogyo Kabushiki Kaisha, Tokyo, Japan

[21] Appl. No.: 667,995

[22] Filed: Jun. 19, 1996

[30]       Foreign Application Priority Data

Jun. 20, 1995  [JP]  Japan ................................ 7-153648

[51] Int. Cl.$^6$ .................. B60T 8/26; B60T 8/32
[52] U.S. Cl. ........................ 303/186; 303/DIG. 6
[58] Field of Search .................... 303/9–71, 155, 303/166, 167, 168, 186–188, 191, DIG. 1–4, DIG. 6

[56]              References Cited

U.S. PATENT DOCUMENTS

| | | | |
|---|---|---|---|
| 5,390,991 | 2/1995 | Tozu et al. | 303/21.1 X |
| 5,425,574 | 6/1995 | Sano | 303/154 X |
| 5,505,532 | 4/1996 | Tozu et al. | 303/165 X |
| 5,551,771 | 9/1996 | Akuzawa et al. | 303/186 |

FOREIGN PATENT DOCUMENTS

| | | |
|---|---|---|
| 51-26584 | 8/1976 | Japan . |
| 6-144178 | 5/1994 | Japan . |

*Primary Examiner*—Josie Ballato
*Attorney, Agent, or Firm*—Nikaido Marmelstein Murray & Oram LLP

[57]                ABSTRACT

In a braking-force distribution control system for a vehicle, which is capable of controlling the ratio of a braking liquid pressure for front wheels to a braking liquid pressure for rear wheels based on a comparison of front and rear wheel speeds, a correcting factor is calculated in a correcting factor calculating device based on the ratio of front and rear wheel rotational speeds detected by front and rear wheel rotational speed sensors. At least one of front and rear wheel speeds, calculated in front and rear wheel speed calculating devices, is corrected by a wheel speed correcting device prior to the calculation of a control quantity in a control quantity calculating device. A control determining device determines whether the range of variation in correcting factor is equal to or larger than a preset value. When the range of variation in correcting factor is equal to or larger than the preset value, a signal indicative of a command to prohibit the calculation of the control quantity based on the result of the comparison of the front and rear wheel speeds in the control quantity calculating device is output from the control determining device. Thus, it is possible to perform an appropriate control of braking-force distribution taking a variation in dynamic radius of a tire into consideration.

4 Claims, 11 Drawing Sheets

BRAKING FORCE DISTRIBUTION CONTROL SYSTEM FOR VEHICLE

BACKGROUND OF THE INVENTION

1. Field of the Invention

The present invention relates to a braking-force distribution control system for a vehicle including front and rear wheel brakes for exhibiting braking forces corresponding to braking liquid pressures, front and rear wheel rotational speed sensors for detecting front and rear wheel rotational speeds, front and rear wheel speed calculating means for calculating front and rear wheel speeds based on the front and rear wheel rotational speeds detected by the front and rear wheel rotational speed sensors and based on front and rear wheel diameters, braking pressure regulating means capable of regulating the ratio of the braking liquid pressure for the front and rear wheels, and control quantity calculating means for calculating a control quantity for the braking pressure regulating means based on comparison of the front and rear wheel speeds calculated in the front and rear wheel speed calculating means.

2. Description of the Related Art

Braking force distribution control systems are conventionally known from Japanese Patent Publication No. 51-26584 and Japanese Patent Application Laid-open No. 6-144178. In the above known systems, optimal braking forces corresponding to loads applied to the front and rear wheels are provided by controlling the longitudinal braking-force distribution to eliminate a difference between the front and rear wheel speeds. This is based on the following principle: When a braking force is generated for a tire receiving a vertical drag force N from a road surface, a slip rate λ is represented, simplistically, in a very small region by the following equation:

$$\lambda = K \times (B/N) \text{ (wherein K is a constant)}$$

On the other hand, the ideal braking-force distribution is to ensure that the front and rear wheel braking forces are proportional to the vertical drag force. Therefore, the front and rear wheel slip rates λ may be equalized. Thus, if the vehicle speed is represented by $V_V$ and the wheel speed is represented by $V_W$, the slip rate λ is determined according to the following equation:

$$\lambda = (V_V - V_W)/V_V$$

Therefore, if the braking-force distribution is controlled so that the front and rear wheel speeds $V_W$ are equal to each other, the front and rear wheel slip rates λ can be equalized. More specifically, control is conducted by controlling the braking pressure for the rear wheels, so that the rear wheel speed $V_W$ is equal to the front wheel speed $V_W$.

It is difficult to directly measure the wheel speeds $V_W$. In the existing circumstances, a rotational speed ω of a tire is detected by a rotational speed sensor such as an electromagnetic pick-up. If a dynamic radius of the tire is represented by r, a wheel speed $V_W$ is calculated according to the following equation:

$$V_W = r \times \omega$$

However, the dynamic radius r may be varied on the order of $10^{-1}$ to 1% depending upon various conditions such as air pressure in the tire, load, vehicle speed and the like. When a spare tire is used, and when a studless tire is mounted only on a driving wheel, the dynamic radius r may be varied on the order of 3 to 10%.

On the other hand, the slip rate λ which may be produced during braking is on the order of at most 3 to 5% (see FIG. 11 illustrating the relationship between the slip rate λ and the friction coefficient μ) even during sudden braking. To control the slip rate λ of such a small value so that the front and rear wheel slip rates are equal to each other, it is necessary to accurately calculate the wheel speed $V_W$ with an accuracy on the order of $10^{-1}$%.

In the known system, however, the control of the longitudinal braking-force distribution is conducted to eliminate a difference between the front and rear wheel speeds which are calculated based on the assumption that the dynamic radius does not vary. In such a system, it is difficult to provide an ideal distribution of braking force. More specifically, for example, in an arrangement such that the braking liquid pressure for the rear wheels is controlled, if the dynamic radius $r_F$ of the front wheel is smaller than the dynamic radius $r_R$ of the rear wheel ($r_F < r_R$), the rotational speed $\omega_F$ of the front wheel is larger than the rotational speed $\omega_R$ of the rear wheel ($\omega_F > \omega_R$). A relationship, $V_{WF} > V_{WR}$ is produced between the front and rear wheel speeds $V_{WF}$ and $V_{WR}$ determined based on the rotational speeds $\omega_F$ and $\omega_R$. In this case, at a point in time when brakes are not applied, the relationship, $V_{WF} > V_{WR}$ is already established. Therefore, if the control of the braking-force distribution is conducted based on the difference between the front and rear wheel speeds $V_{WF}$ and $V_{WR}$, there is a possibility that the rear wheel braking force is excessively suppressed. Conversely, if $r_F > r_R$, there is a possibility that the rear wheel braking force is too large.

SUMMARY OF THE INVENTION

Accordingly, it is an object of the present invention to provide a braking-force distribution control system for a vehicle, wherein an appropriate longitudinal distribution of braking force can be performed in consideration of a variation in the dynamic radius of a tire.

To achieve the above object, according to the present invention, there is provided a braking-force distribution control system for a vehicle, including a front wheel brake for exhibiting a braking force corresponding to a braking liquid pressure; a rear wheel brake for exhibiting a braking force corresponding to a braking liquid pressure, a front wheel rotational speed sensor for detecting a front wheels rotational speed; a rear wheel rotational speed sensor for detecting a rear wheel rotational speed; a front wheel speed calculating device for calculating front wheel speed based on the front wheel rotational speed detected by the front wheel rotational speed sensor and based on a front wheel diameter; a rear wheel speed calculating device for calculating a rear wheel speed based on of the rear wheel rotational speed detected by the rear wheel rotational speed sensor and based on a rear wheel diameter; a braking pressure regulating device capable of regulating the ratio of the braking liquid pressure for the front and rear wheels; and a control quantity calculating device for calculating a control quantity for the braking pressure regulating device based on comparison of the front and rear wheel speeds calculated in the front and rear wheel speed calculating devices. The breaking-force distribution control system further includes a correcting-factor calculating device for calculating a correcting factor corresponding to a difference between a preset wheel diameter and an actual wheel diameter, based on the ratio of the front and rear wheel rotational speeds detected by the front and rear wheel rotational speed sensors; wheel speed correcting device for correcting at least one of the front and rear wheel speeds calculated by the front and rear wheel speed calculating devices prior to the calculation of the control quantity by the control quantity calculating device; and control determining device for determining whether a range of variation in the correcting factor calculated by the correcting factor calculating device is equal to or larger than a preset value. Thus, a signal indicative of a command to prohibit the calculation of the control quantity based on comparison of the front and rear wheel speeds in the control quantity calculating device is output when the range of variation in the correcting factor is equal to or larger than the preset value.

With such a feature of the present invention, it is possible to appropriately conduct the control of the braking-force distribution by taking into consideration a variation in dynamic radius of a tire, by calculating the correcting factor corresponding to the difference between the preset wheel diameter and the actual wheel diameter in the correcting factor calculating device, based on the ratio of the rotational speeds of the front and rear wheels and calculating the control quantity in the control quantity calculating device, based on the wheel speed resulting from the correction by the correcting factor in the wheel speed correcting device. Moreover, in a state in which the correcting factor is substantially varied depending upon traveling conditions of the vehicle, the unnecessary control of the braking-force distribution due to a variation in dynamic radius of the tire in a short time can be eliminated by prohibiting the calculation of the control quantity based on the result of the comparison of the front and rear wheel speeds.

According to another aspect and feature of the present invention, said correcting factor calculating device averages the correcting factors which have been calculated a predetermined number of times under conditions in which the vehicle is in a stable traveling state, and outputs the averaged value, and the control determining device determines whether the range of variation in the correcting factor is equal to or larger than the preset value, based on the comparison of the last correcting factor output from the correcting factor calculating device with the current correcting factor output from the correcting factor calculating device. Thus, it is possible to reliably determine whether the dynamic radius of the tire is varied over a relatively long period, thereby effecting the calculation of the control quantity in the control quantity calculating device.

According to a further aspect and feature of the present invention, the control quantity calculating device calculates the control quantity such that a braking liquid pressure ratio depending upon the braking liquid pressure for the front wheel brake is provided in a state in which the calculation of the control quantity based on comparison of the front and rear wheel speeds has been prohibited in response to a signal input from the control determining device. Thus, even in a state in which the control of the distribution based on the comparison of the front and rear wheel speeds is not carried out, the control of the braking-force distribution of some degree can be performed.

The above and other objects, features and advantages of the invention will become apparent from the following description of the preferred embodiments in conjunction with the accompanying drawings.

DETAILED DESCRIPTION OF THE PREFERRED EMBODIMENTS

Figure 1:
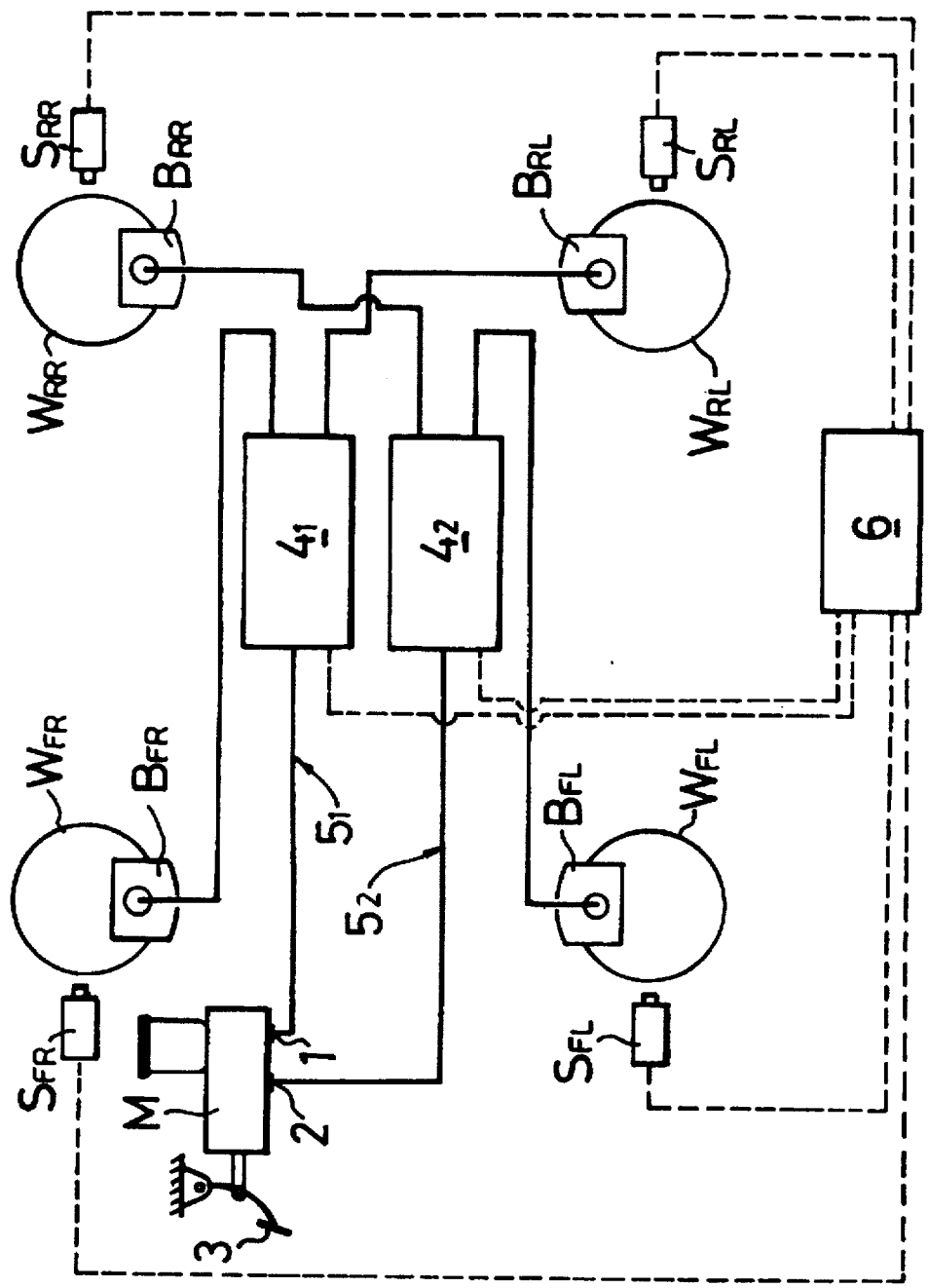
FIG. 1 is a diagrammatic illustration of a liquid pressure circuit of a brake system incorporating a first embodiment of the present invention.

A first embodiment of the present invention, which is applied to a front wheel drive vehicle, will now be described with reference to FIGS. 1 to 7. Referring first to FIG. 1, a brake pedal 3 is operatively connected to a tandem-type master cylinder M. The master cylinder M has first and second output ports 1 and 2, so that independent liquid pressures are output from the first and second output ports 1 and 2 in response to depression of the brake pedal 3. A first braking liquid pressure system $S_1$, including a braking pressure regulating means $4_1$, is connected to the first output port 1. A right front wheel brake $B_{FR}$ mounted on a right front wheel $W_{FR}$ and a left rear wheel brake $B_{RL}$ mounted on a left rear wheel $W_{RL}$ are connected to the first braking liquid pressure system $S_1$. A second braking liquid pressure system $S_2$, including a braking pressure regulating means $4_2$, is connected to the second output port 2. A left front wheel brake $B_{FL}$ mounted on a left front wheel $W_{FL}$ and a right rear wheel brake $B_{RR}$ mounted on a right rear wheel $W_{RR}$ are connected to the second braking liquid pressure system $S_2$. Each of the brakes $B_{FL}$, $B_{FR}$, $B_{RL}$ and $B_{RR}$ exhibits a braking force corresponding to a braking liquid pressure applied thereto. Each brake, for example, may be a disk brake.

Rotational speeds of the left and right front wheels $W_{FL}$ and $W_{FR}$ are detected by left and right front wheel rotational speed sensors $S_{FL}$ and $S_{FR}$, respectively. Rotational speeds of the left and right rear wheels $W_{RL}$ and $W_{RR}$ are detected by left and right rear wheel rotational speed sensors $S_{RL}$ and $S_{RR}$, respectively. Detection values detected by the rotational speed sensors $S_{FL}$, $S_{FR}$, $S_{RL}$ and $S_{RR}$ are input to an electronic control unit 6. The electronic control unit 6 controls the operation of the braking pressure regulating means $4_1$ and $4_2$ based on the detection values detected by the rotational speed sensors $S_{FL}$, $S_{FR}$, $S_{RL}$ and $S_{RR}$.

Figure 2:
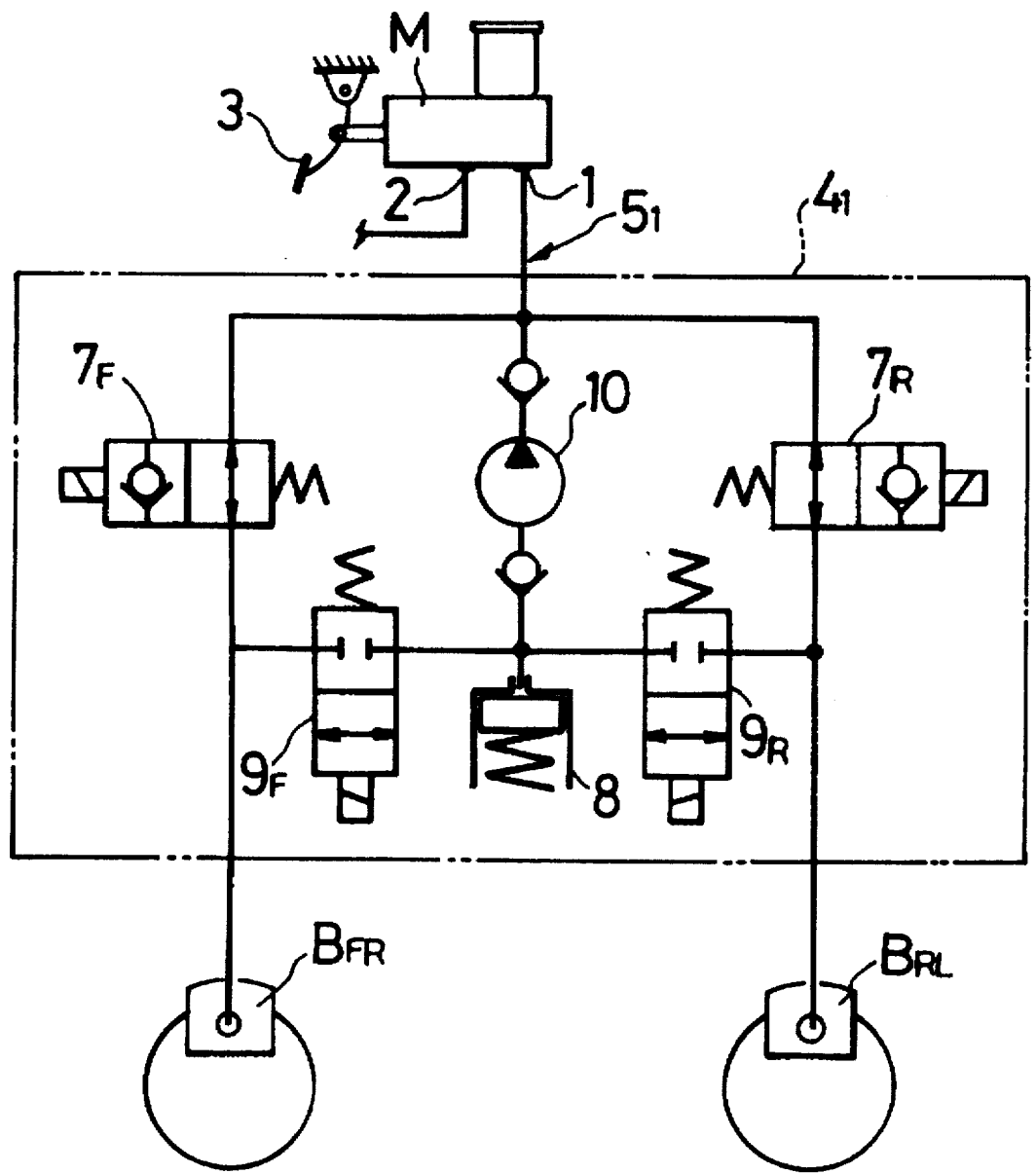
FIG. 2 is a diagrammatic illustration of the arrangement of a braking pressure regulating means.

Referring to FIG. 2, the braking pressure regulating means $4_1$ in the first braking liquid pressure system $S_1$ is a conventionally well-known antilock brake control system which includes a) an electromagnetic supply valve $7_F$ for permitting a braking liquid pressure, output from the first output port 1 in the master cylinder M, to be applied to the right front wheel brake $B_{FR}$, b) an electromagnetic supply valve $7_R$, for permitting a braking liquid pressure output from the first output port 1, to be applied to the left rear wheel brake $B_{RL}$, c) a reservoir 8, d) an electromagnetic release valve $9_F$ capable of releasing the braking liquid pressure for the right front wheel brake $B_{FR}$ to the reservoir 8, e) an electromagnetic release valve $9_R$ capable of releasing the braking liquid pressure for the left rear wheel brake $B_{LR}$ to the reservoir 8, and f) a pump 10 capable of returning a working liquid pumped from the reservoir 8 toward the first output port 1. Each of the electromagnetic supply valves $7_F$ and $7_R$ is capable of being switched between a deenergized state in which the first output port 1 and each of the wheel brakes $B_{FR}$ and $B_{RL}$ communicates with each other, and an energized state in which the flow of the braking liquid is cut off from the first output port 1 to each of the wheel brakes $B_{FR}$ and $B_{RL}$. Each of the electromagnetic release valves $9_F$ and $9_R$ is capable of being switched between a deenergized state in which each of the wheel brakes $B_{FR}$ and $B_{RL}$ and the reservoir 8 is out of communication with each other, and an energized state in which each of the wheel brakes $B_{FR}$ and $B_{RL}$ and the reservoir 8 communicate with each other.

In such braking pressure regulating means $4_1$, the antilock brake control of the right front wheel brake $B_{FR}$ and the left rear wheel brake $B_{RL}$ can be performed and, the distribution of the braking force to the right front wheel brake $B_{FR}$ and the left rear wheel brake $B_{RL}$ can be regulated, by the control of the electromagnetic supply valves $7_F$ and $7_R$ and the electromagnetic release valves $9_F$ and $9_R$.

The braking pressure regulating means $4_2$ in the second braking liquid pressure system $5_2$ is constructed in the same manner as the braking pressure regulating means $4_1$. Thus, the antilock brake control of the left front wheel brake $B_{FL}$ and the right rear wheel brake $B_{RR}$ can be performed, and the distribution of the braking force to the left front wheel brake $B_{FL}$ and the right rear wheel brake $B_{RR}$ can be regulated.

Figure 3:
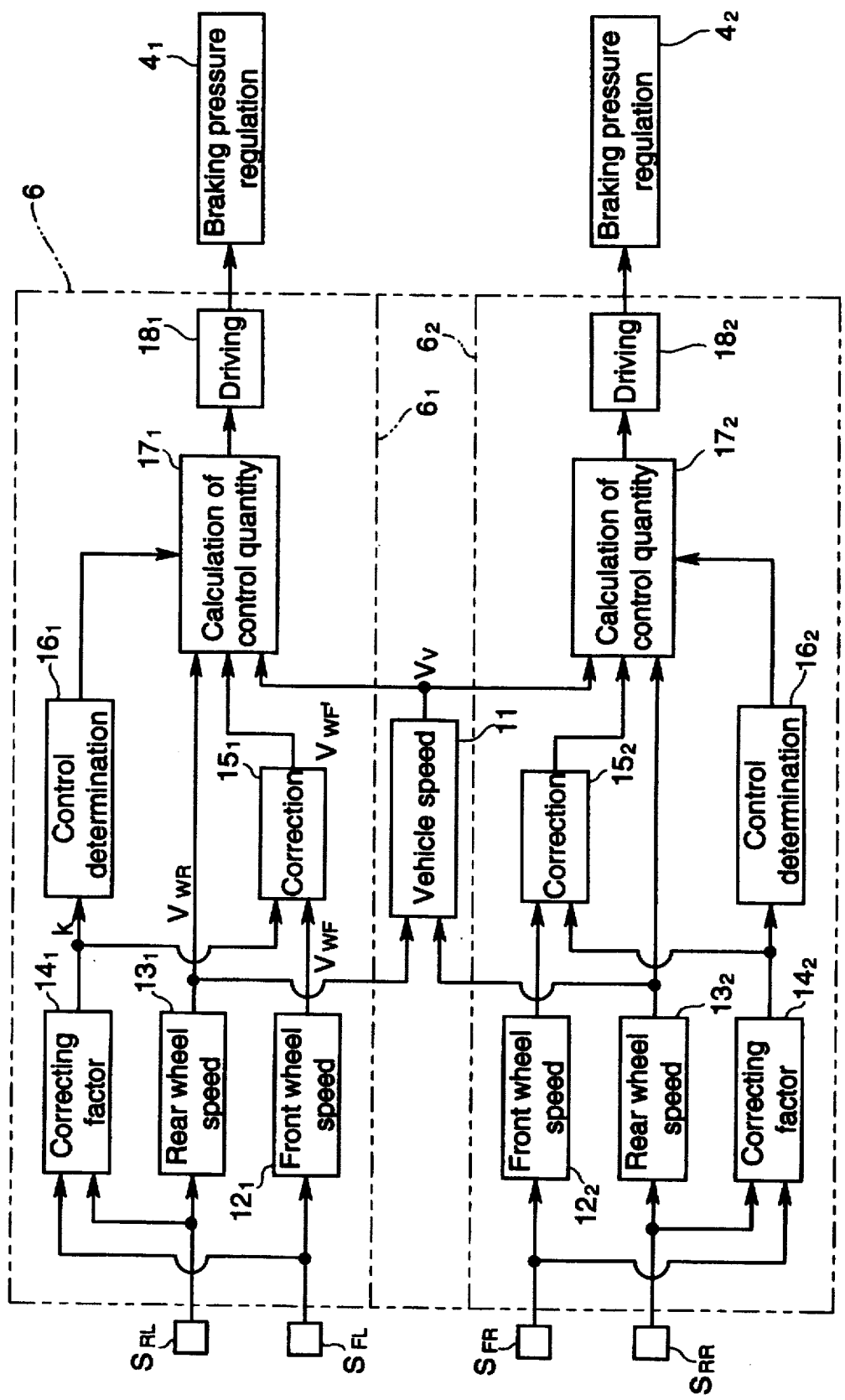
FIG. 3 is a block diagram illustrating the function and arrangement of an electronic control unit.

Referring to FIG. 3, the electronic control unit 6 regulates the distribution of the braking force to the right front wheel brake $B_{FR}$ and the left rear wheel brake $B_{RL}$ and regulates the distribution of the braking force to the left front wheel brake $B_{FL}$ and the right rear wheel brake $B_{RR}$ by the energization and deenergization of the electromagnetic supply valves $7_F$ and $7_R$ and the electromagnetic release valves $9_F$ and $9_R$ in the braking pressure regulating means $4_1$ and $4_2$. The electronic control unit 6 includes a first control section $6_1$ for controlling the operation of the braking pressure regulating means $4_1$ based on the detection values detected by the left front wheel rotational speed sensor $S_{FL}$ and the left rear wheel rotational speed sensor $S_{RL}$, a second control section $6_2$ for controlling the operation of the braking pressure regulating means $4_2$ based on the detection values detected by the right front wheel rotational speed sensor $S_{FR}$ and the right rear wheel rotational speed sensor $S_{RR}$, and a vehicle speed calculating means 11 common to both the control sections $6_1$ and $6_2$.

The first control section $6_1$ includes a front wheel speed calculating means $12_1$ for calculating a front wheel speed $V_{WF}$ based on a front wheel rotational speed $\omega_F$ detected by the left front rotational speed sensor $S_{FL}$ and a front wheel diameter. A rear wheel speed calculating means $13_1$ calculates a rear wheel speed based on a rear wheel rotational speed $\omega_R$ detected by the left rear wheel rotational speed $S_{RL}$ and a rear wheel diameter. A correcting factor calculating means $14_1$ calculates a correcting factor k based on the front and rear wheel rotational speeds $\omega_F$ and $\omega_R$ detected by the left front wheel and left rear wheel rotational speed sensors $S_{FL}$ and $S_{RL}$. A wheel speed correcting means $15_1$ corrects the front wheel speed $V_{WF}$ determined in the front wheel speed calculating means $12_1$ by the correcting factor k. A control determining means $16_1$ determines whether the variation width of the correcting factor k, determined in the correcting factor calculating means $14_1$, is equal to or larger than a preset value and outputs a prohibiting signal when the variation width of the correcting factor k is equal to or larger than a preset value. A control quantity calculating means $17_1$ calculates a control quantity based on a value $V_{WF}$, resulting from the correction the front wheel speed $V_{WF}$, determined in the front wheel speed calculating means $12_1$, by the wheel speed correcting means $15_1$, as well as based on the vehicle speed $V_V$ determined in the vehicle speed calculating means 11. The control quantity calculating means $17_1$ also changes the control mode in accordance with a signal input from the control determining means $16_1$. A driving means $18_1$ is adapted to control the operation of the braking pressure regulating means $4_1$ based on the control quantity determined in the control quantity calculating means $17_1$.

The second control section $6_2$ has the same construction as the first control section $6_1$, wherein its components are only shown by reference characters each affixed with a suffix 2, substituted for the suffix 1, of each of the reference characters designating the components of the first control section $6_1$, and the detailed description thereof is omitted.

The vehicle speed calculating means 11 calculates a presumed vehicle speed $V_V$ by averaging the rear wheel speeds $V_{WR}$ determined in the rear wheel speed calculating means $13_1$ of the first control section $6_1$ and the rear wheel speed calculating means $13_2$ of the second control section $6_2$. A value resulting from the filtering of an average value of the rear wheel speeds $V_{WR}$ is provided as a presumed vehicle speed $V_V$.

Figure 4:
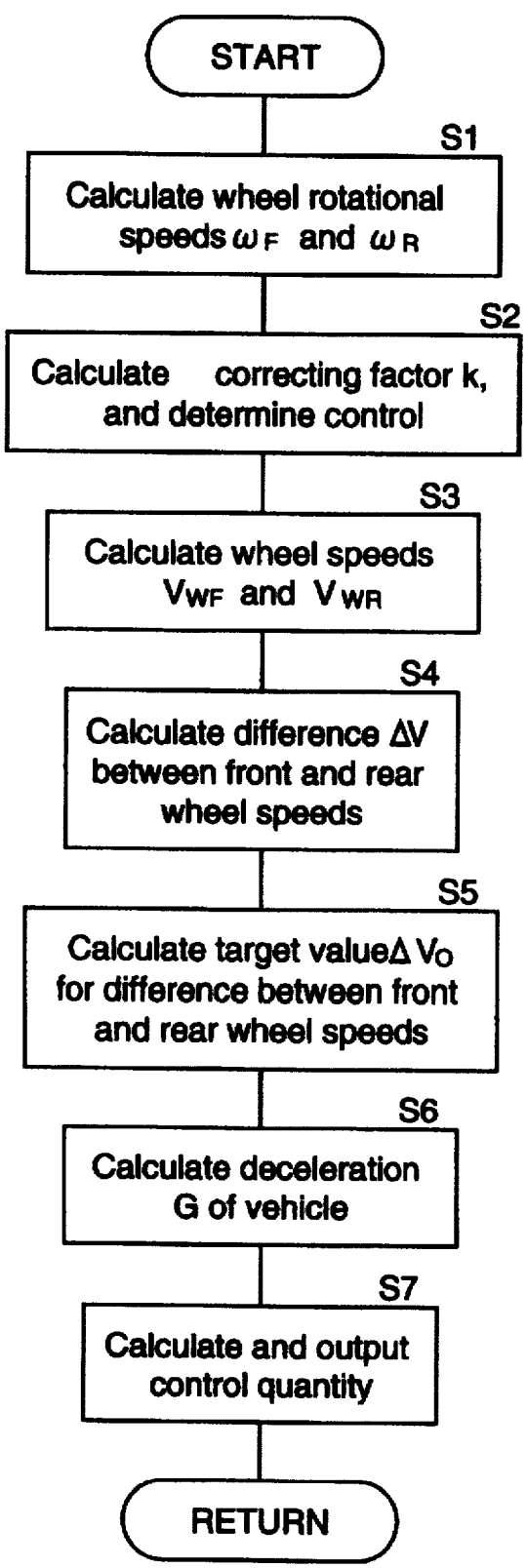
FIG. 4 is a flow chart illustrating a procedure for controlling the distribution of braking force.
Figure 5:
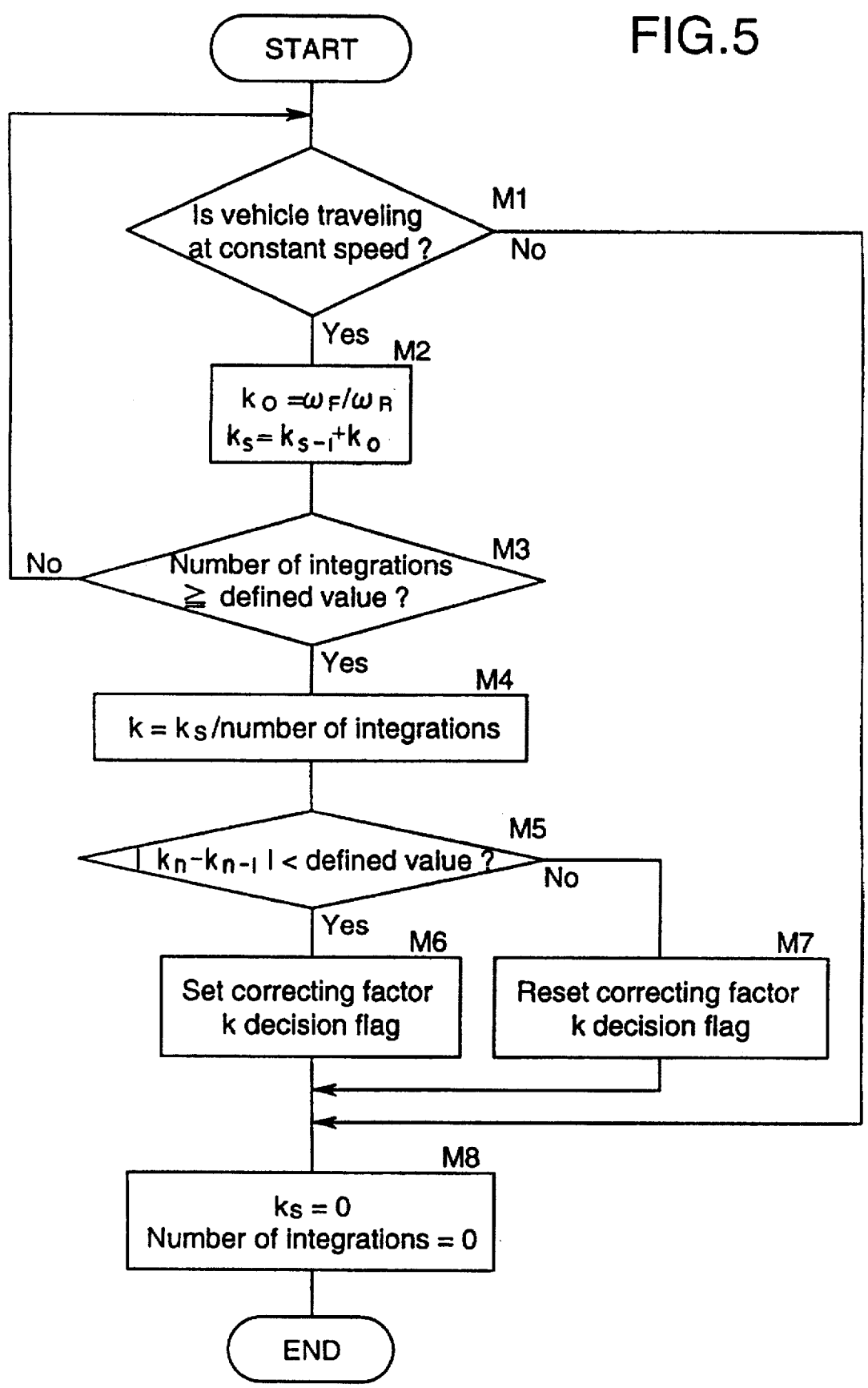
FIG. 5 is a flow chart illustrating a procedure for calculating a correcting factor at step S2 shown in FIG. 4.
Figure 6:
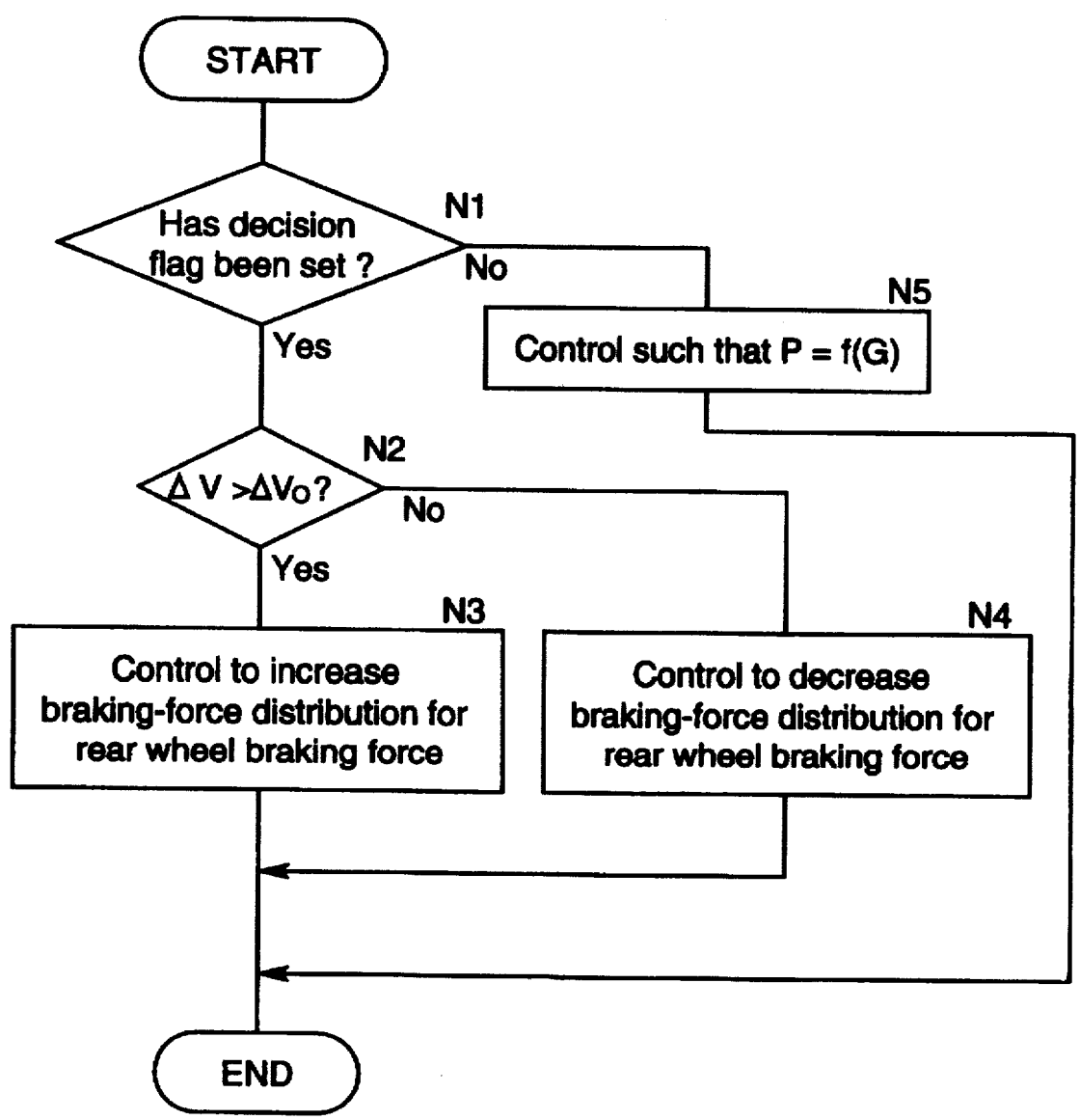
FIG. 6 is a flow chart illustrating a procedure for calculating a control quantity at step S7 shown in FIG. 4.

In control sections $6_1$ and $6_2$ of the electronic control unit 6, the control calculation is carried out according to a procedure shown in FIGS. 4, 5 and 6. First, at step S1 shown in FIG. 4, a front wheel rotational speed $\omega_F$ and a rear wheel rotational speed $\omega_R$ are calculated. At step S2, the calculation of the correcting factor k is carried out in the correcting factor determining means $14_1$ and $14_2$, and control determination is carried out in the control determining means $16_1$ or $16_2$.

The calculation of the correcting factor k and the control determination at step S2 are carried out according to a procedure shown in FIG. 5. The procedure in FIG. 5 will be described below. At step M1, it is determined whether the vehicle speed $V_V$ input from the vehicle speed calculating means 11 is a constant speed. Only when the vehicle speed $V_V$ is a constant speed, the processing is advanced to step M2. The determination at step M1 is made depending upon whether the variation rates in rotational speeds $\omega_F$ and $\omega_R$ are within a predetermined variation rate, for example, until the number of integrations at step M3, which will be described hereinafter, has reached a defined value. This is for the purpose of eliminating slip produced by an acceleration or deceleration and an extremely accurate intrinsic dynamic radius of a tire is determined. In order to eliminate a lower speed range in which an error due to a sudden turn is liable to be produced, and a higher speed range in which the slipping of a driving wheel is large, the determination at step M1 may be made based on a vehicle speed. When a steering angle sensor is mounted, the determination at step M1 may be conducted based on a steering angle so as to eliminate the case where the steering angle is large. Further, when a driving force can be calculated by a throttle opening degree of an engine, an amount of fuel injected or the like, the error due to the driving force being large may be eliminated.

At step M2, a ratio $k_O$ $(=\omega_F/\omega_R)$ of the front wheel rotational speed $\omega_F$ to the rear wheel rotational speed $\omega_R$ is calculated, and a ratio integration value $(=K_{S-1}+k_o)$ is calculated. The initial value of the ratio integration value $k_S$ is "0".

At step M3, it is determined whether the number of integrations has reached the defined value, e.g., about 200. The higher the vehicle speed, the larger the error of measurement of the rotational speed and hence, it is desirable that the defined value is set at a large value, as the vehicle speed $V_V$ is large. If it is determined at step M3 that the number of integrations has not reached the defined value, the processing returns to step M1. If it is determined that the number of additions has reached the defined value, the addition value $k_S$ is divided by the number of integrations at step M4, thereby providing a correcting factor k as a rotational speed ratio which is an average by the defined number of integrations. In this case, the resulting correcting factor k may be subjected to a filtering.

Steps M5 to M7 indicate a procedure for the control determination in the control determining means $16_1$ and $16_2$. At step M5, it is determined whether the absolute value of a difference between the correcting value $k_{n-1}$ provided last time and the correcting value $k_n$ provided this time is smaller than the defined value. If the absolute value is smaller than the defined value, then a decision flag is set at step M6 from the determination that the correcting value k has been decided. If the absolute value is equal to or larger than the defined value, then the decision flag is reset at step M7 from the determination that the correcting value k has not been decided. In other words, the control determining means $16_1$ and $16_2$ determine whether the variation range of the correcting factor k is equal to or larger than a defined value. If the variation range of the correcting factor k is equal to or larger than the defined value, the decision flag is reset from the determination that the correcting factor has been undecided. This resetting outputs a prohibiting signal.

At step M8, the addition value $k_S$ is set at "0", and the number of integrations is set at "0". If it is determined at step M1 that the vehicle speed $V_V$ is not a constant speed, the processing is advanced from step M1 to step M8.

Referring again to FIG. 4, at step S3 after the completion of the calculation of the correcting factor k and of the control determination, a front wheel speed $V_{WF}$ and a rear wheel speed $V_{WR}$ are calculated. If the preset value of the dynamic tire radius is represented by r, the following equations are established:

$$V_{WF}=r\times\omega_F$$

$$V_{WR}=r\times\omega_R$$

The rear wheel speed $V_{WR}$, as detected, is inputted to the control quantity calculating means $17_1$ and $17_2$, and the front wheel speed $V_{WF}$ is subjected to the following correction by the correcting factor k in the wheel speed correcting means $15_1$ and $15_2$:

$$V_{WF}'=V_{WF}/k$$

The steps S4 to S7 indicate a procedure for the calculation in the control quantity calculating means $17_1$ and $17_2$. At step S4, a difference $\Delta V$ between the front and rear wheel speeds is calculated according to the following equation.

$$\Delta V=V_{WR}-V_{WF}'$$

At step S5, a target value $\Delta V_O$ for the difference between the front and rear wheel speeds is calculated according to the following equation:

$$\Delta V_O=\lambda\times V_V-d$$

wherein each of $\lambda$ and d is a constant value.

At step S6, a vehicle's deceleration G is calculated based on the vehicle speed $V_V$ and then, at step S7, a control quantity is calculated. The processing at step S7 is carried out according to a procedure shown in FIG. 6. At step N1 in FIG. 6, it is determined whether the decision flag has been set, i.e., whether the prohibiting signal has not been output from the control determining means $16_1$ and $16_2$. If the vehicle is in the state in which the prohibiting signal has not been output, it is determined at step N2 whether $\Delta V \geq \Delta V_O$. The fact that $\Delta V \geq \Delta V_O$ indicates a state in which the rear wheel speed $V_{WR}$ is too fast. In this case, the control quantity is determined at step N3 to increase the rear wheel braking force. If it is determined at step N2 that $\Delta V<\Delta V_O$, the rear wheel speed $V_{WR}$ is too low. In this case, the control quantity is determined at step N4 so as to decrease the rear wheel braking force.

Figure 7:
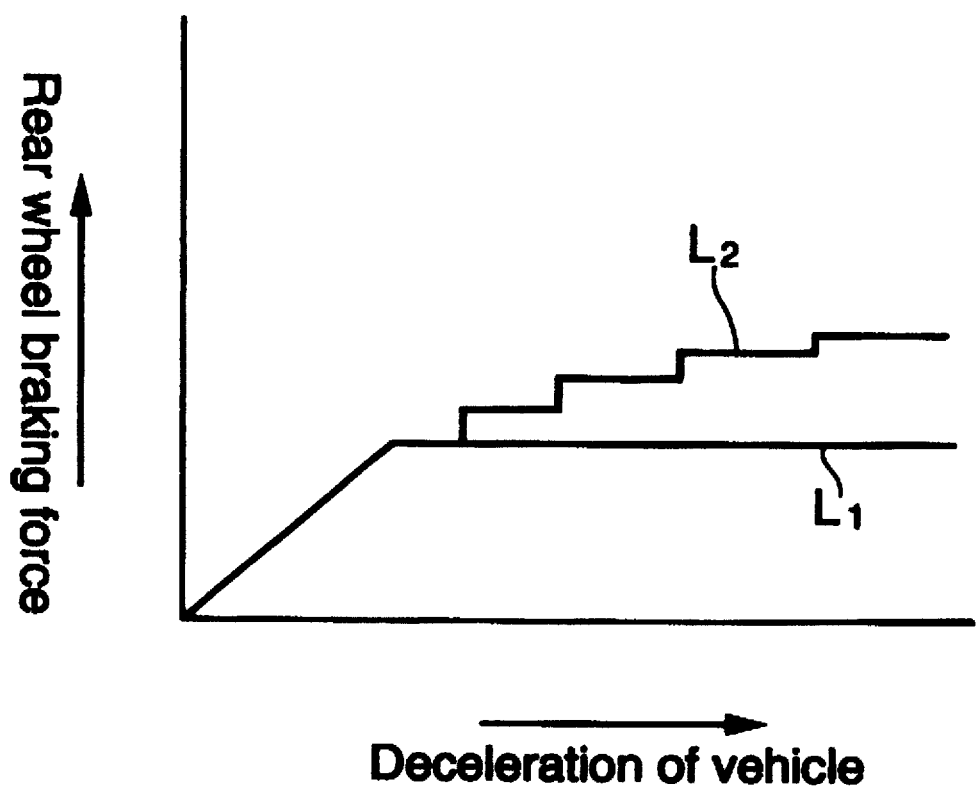
FIG. 7 is a diagram illustrating an example of the control of front wheel braking force in accordance with a vehicle's deceleration.

If it is determined at step N1 that the vehicle is in the state in which the prohibiting signal has been output from the control determining means $16_1$ and $16_2$, then the control quantity is determined so that the rear wheel braking force is varied as shown in FIG. 7 in accordance with the deceleration G of the vehicle. A line $L_1$ in FIG. 7 indicates an example in which the rear wheel braking force is kept constant after the deceleration G of the vehicle has reached a given value, and a line L2 indicates an example in which the rear wheel braking force is stepwise varied in accordance with the deceleration G of the vehicle.

The operation of the first embodiment will be described below. A correcting factor k corresponding to a difference between an actual wheel diameter and a preset wheel diameter is calculated in each of the correcting factor calculating means $14_1$ and $14_2$. One of the wheel speeds $V_{WF}$ and $V_{WR}$, i.e., the front wheel speed $V_{WF}$ is corrected by the correcting factor k in each of the wheel speed correcting means $15_1$ and $15_2$. A control quantity for each of the braking pressure regulating means $4_1$ and $4_2$ is calculated in each of the control quantity calculating means $17_1$ and $17_2$ based on the rear wheel speed $V_{WR}$ determined in the rear wheel speed calculating means $13_1$ and $13_2$ and the front wheel speed $V_{WF}'$ resulting from the correction. Therefore, when the dynamic radius of the tire has been varied, the control of the braking force distribution taking the variation in dynamic radius into consideration can be performed appropriately.

Moreover, in a state in which the correcting factor k is substantially varied due to conditions of traveling of the vehicle, e.g., when the correcting factor k is largely varied due to slipping of the driving wheel on a slope, the calculation of the control quantity based on comparison of the front and rear wheel speeds in the control quantity calculating means $17_1$ and $17_2$ is prohibited by the prohibiting signal output from the control determining means $16_1$ and $16_2$. Hence, the unnecessary control of the braking-force distribution due to a variation in dynamic radius in a short time can be eliminated. The correcting factor calculating means $14_1$ and $14_2$ average the correcting factors calculated a predetermined number of times under conditions where the vehicle is in a stable traveling state, and output an average value. In the control determining means $16_1$ and $16_2$, it is determined whether the variation range of the correcting factor is equal to or larger than a preset value, based on the comparison of the last correcting factor output from the correcting factor calculating means $14_1$ and $14_2$ and the current correcting factor output from the correcting factor calculating means $14_1$ and $14_2$. Therefore, unnecessary control of the braking-force distribution due to a variation in dynamic radius in a short time can be reliably eliminated, and it is possible to deal with only the variation in dynamic radius of the tire over a relatively long time period due to variations in air pressure, load and vehicle speed and a variation in wheel diameter due to the mounting of a spare tire or a studless tire, thereby performing an appropriate control of the braking-force distribution taking the variation in dynamic radius of the tire into consideration.

Further, in a state in which the calculation of the control quantity based on comparison of the front and rear wheel speeds, each of the control quantity calculating means $17_1$ and $17_2$ calculates a control quantity, so that a braking liquid pressure ratio depending upon the deceleration G of the vehicle is provided. Therefore, even in the state in which the distribution of the braking force based on comparison of the front and rear wheel speeds has been prohibited, the control of the braking-force distribution of some degree can be performed.

Figure 8:
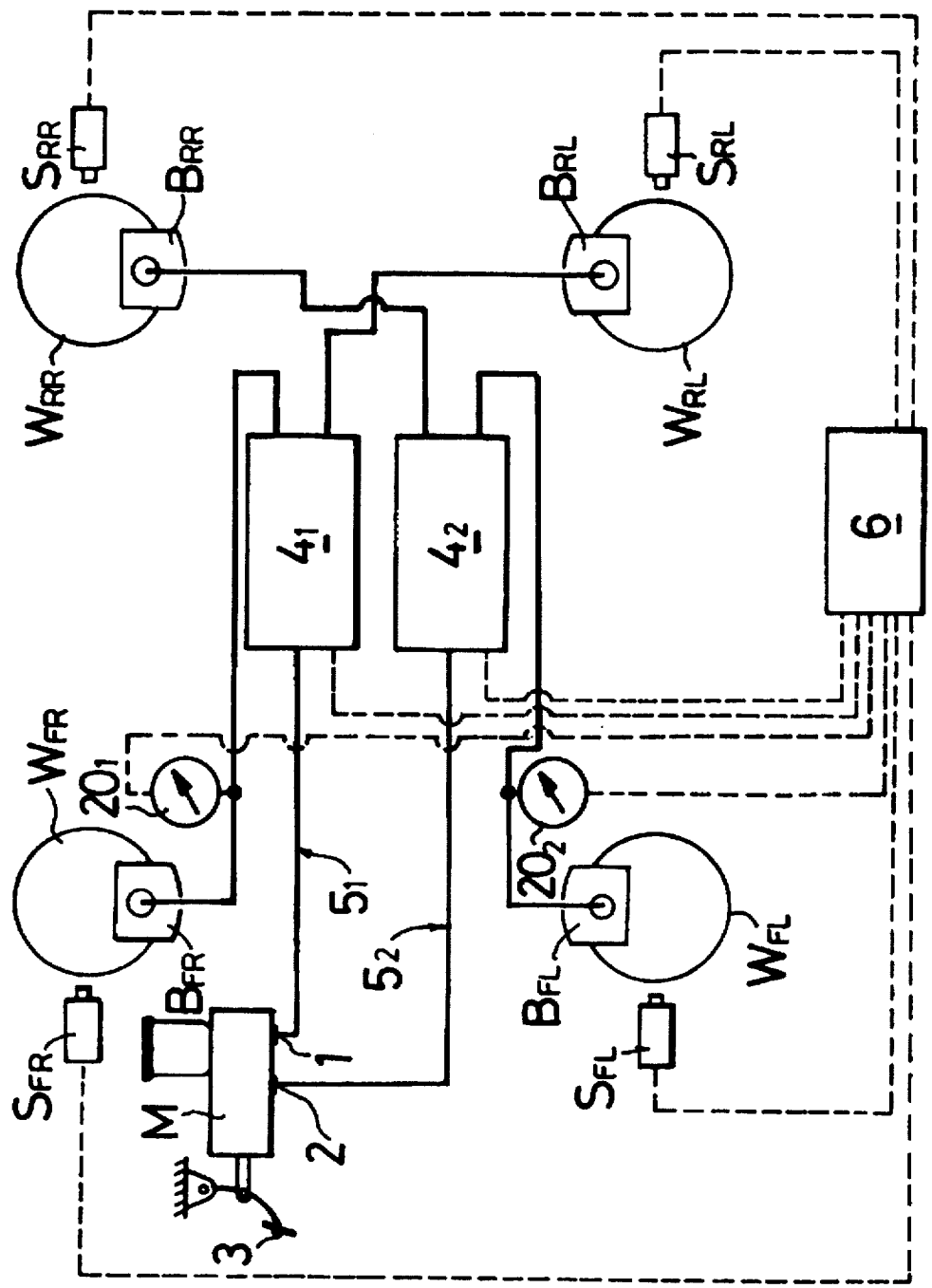
FIG. 8 is a diagrammatic illustration of a liquid pressure circuit, similar to FIG. 1, but according to a second embodiment of the present invention.

FIG. 8 illustrates a second embodiment of the present invention. In the second embodiment, braking liquid pressure for the front wheel brakes $B_{FR}$ and $B_{FL}$ are detected by pressure sensors $20_1$ and $20_2$, respectively. Detection values detected by the pressure sensors $20_1$ and $20_2$ are input to the electronic control unit 6. In the electronic control unit 6, the control is carried out at step N5 in such a manner that braking liquid pressures for the rear wheel brakes $B_{RL}$ and $B_{RR}$ are values determined by functions of the braking liquid pressures for the front wheel brakes $B_{FR}$ and $B_{FL}$.

More specifically, in the state in which the distribution of the braking force based on comparison of the front and rear wheel speeds has been prohibited, a control quantity is calculated in each of the control quantity calculating means $17_1$ and $17_2$, so that a braking liquid pressure ratio depending upon the deceleration G of the vehicle is provided. In the second embodiment, even in the state in which the distribution of the braking force based on comparison of the front and rear wheel speeds has been prohibited, the control of the braking-force distribution of some degree can be performed, as in the first embodiment.

Figure 9:
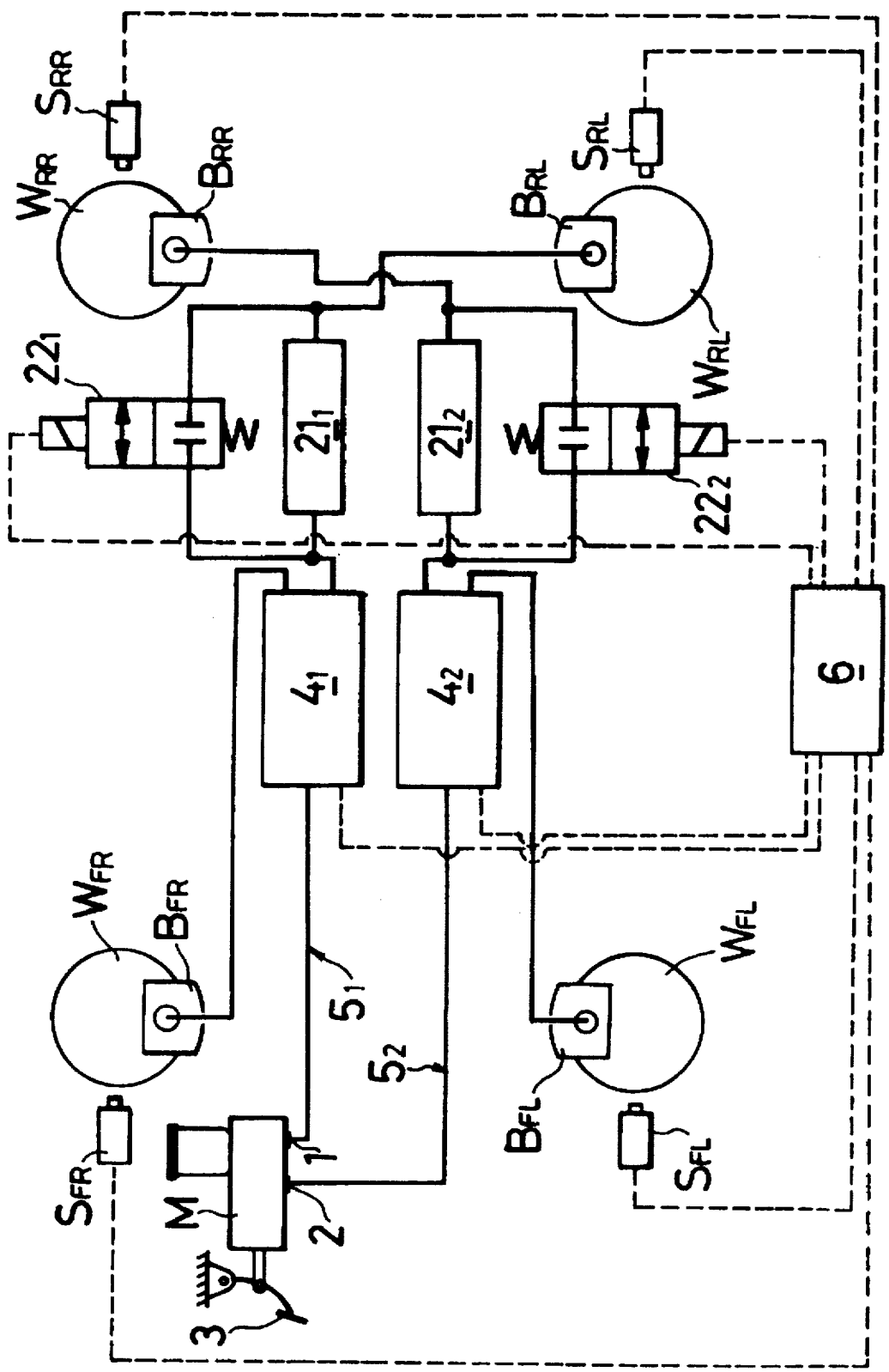
FIG. 9 is a diagrammatic illustration of a liquid pressure circuit, similar to FIG. 1, but according to a third embodiment of the present invention.
Figure 10:
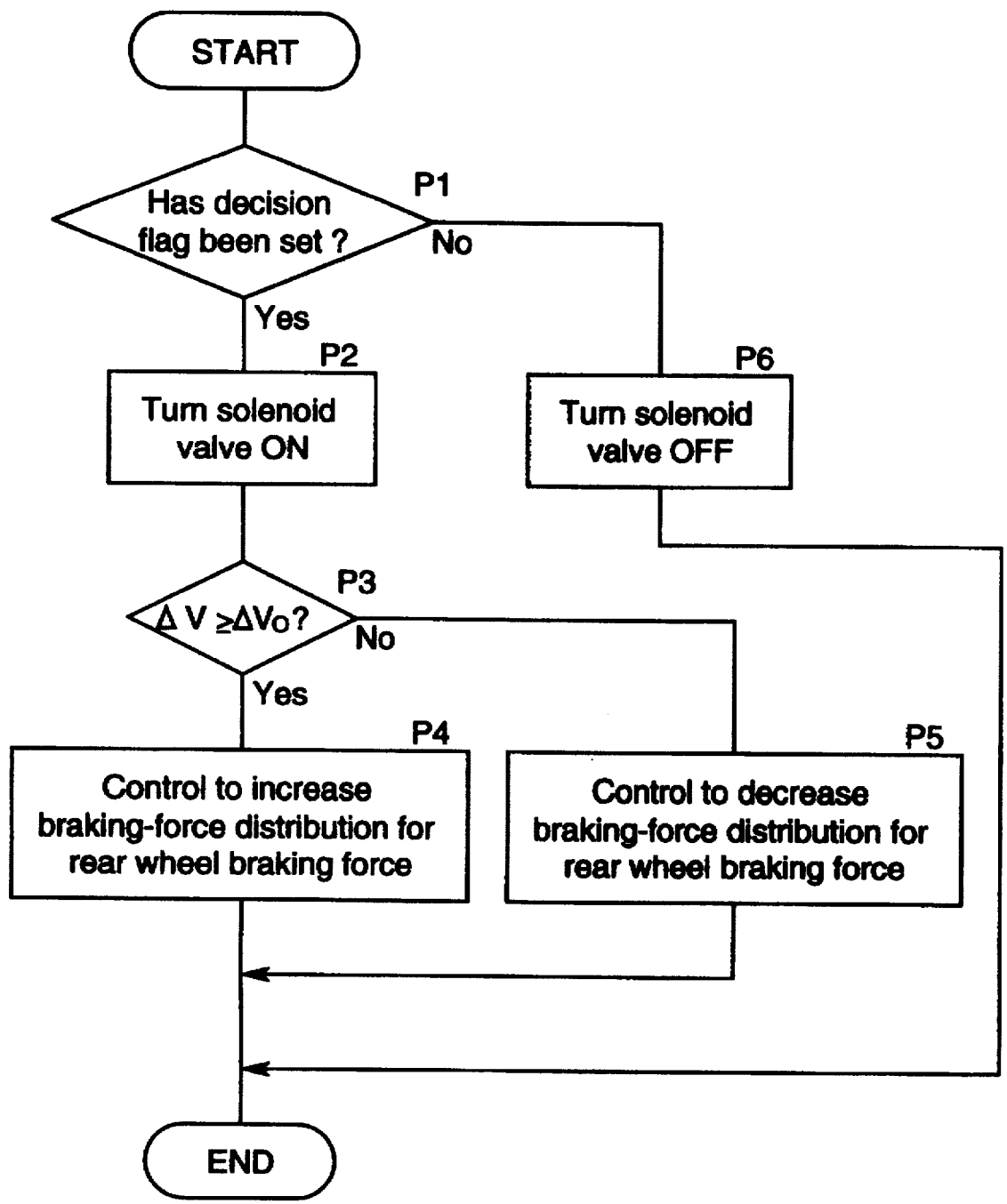
FIG. 10 is a flow chart illustrating a control quantity calculating procedure, similar to FIG. 6, but according to the third embodiment.
Figure 11:
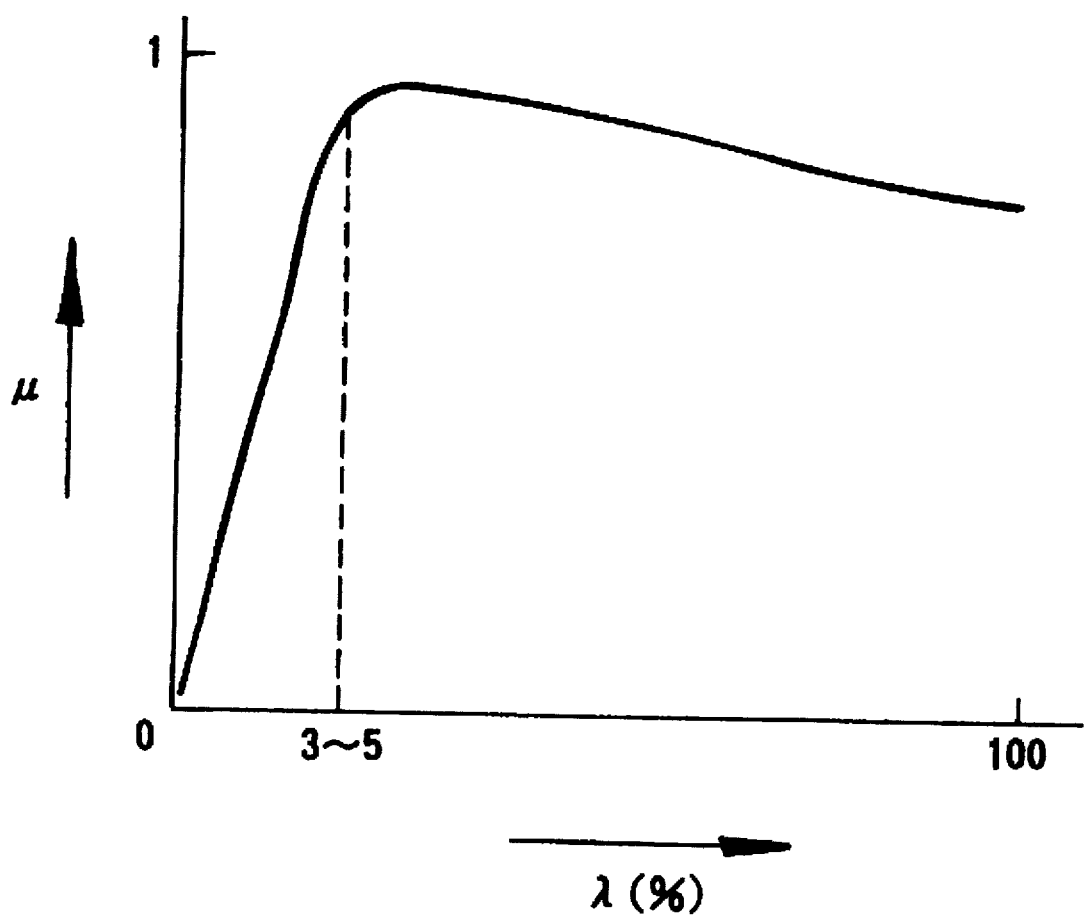
FIG. 11 is a diagram of $\lambda$-$\mu$ characteristic.

FIGS. 9 and 10 illustrate a third embodiment of the present invention, wherein portions or components corresponding to those in each of the previously-described embodiments are designated by like reference numerals.

In the braking liquid pressure systems $5_1$ and $5_2$, proportional pressure-reducing valves $21_1$ and $21_2$ are interposed between the braking pressure regulating means $4_1$ and $4_2$ and the left rear wheel brake $B_{RL}$ as well as the right rear wheel brake $B_{RR}$. Normally-closed solenoid valves $22_1$ and $22_2$ are connected in parallel to the proportional pressure-reducing valves $21_1$ and $21_2$.

The energization and deenergization of the normally-closed solenoid valves $22_1$ and $22_2$ are controlled by the electronic control unit 6. In the electronic control unit 6, the calculation of a control quantity using a sub-routine shown in FIG. 10 in place of the sub-routine shown in FIG. 6 is carried out at step S7 in the flow chart shown in FIG. 4.

Referring to FIG. 10, at step P1, it is determined whether the decision flag has been set, i.e., whether the prohibiting signal has not been output from control determining means $16_1$ and $16_2$. If the prohibiting signal has not been output, then the normally-closed solenoid valves $22_1$ and $22_2$ are energized at step P2. Thus, a liquid pressure output from the braking pressure regulating means $4_1$ and $4_2$ is passed through the normally-closed solenoid valves $22_1$ and $22_2$ and applied to the left and right rear wheel brakes $B_{RL}$ and $B_{RR}$.

Then, at step P3, it is determined that $\Delta V \geq \Delta V_0$. If $\Delta V \geq \Delta V_0$ then the control quantity is determined at step P4 to increase the rear wheel braking force. If $\Delta V < \Delta V_0$, then the control quantity is determined at step P5 to decrease the rear wheel braking force.

It is determined at step P1 that the decision flag has not been set, then the normally-closed solenoid valves $22_1$ and $22_2$ are deenergized. Thus, a liquid pressure output from the braking pressure regulating means $4_1$ and $4_2$ are passed through the proportional pressure-reducing valves $21_1$ and $21_2$ and applied to the left and right rear wheel brakes $B_{RL}$ and $B_{RR}$.

Even in the third embodiment, in a state in which the braking-force distribution based on comparison of the front and rear wheel speeds has been prohibited, the control of the braking-force distribution of some degree can be carried out by the fact that the braking force for the rear wheels is reduced through the proportional pressure-reducing valves $21_1$ and $21_2$.

The example using the antilock brake control system has been shown as the braking pressure regulating means, but a braking pressure regulating means capable of regulating only the liquid pressure for the rear wheel brakes may be used. Although the brake system of the X-piping type has been described, the present invention is also applicable to brake systems of any piping types. Further, although the left and right rear wheel braking pressures are individually controlled, they may be collectively controlled.

Although the embodiments of the present invention have been described, it will be understood that the present invention is not limited to the above-described embodiments, and various modifications in design may be made without departing from the spirit and scope of the invention defined in claims.

What is claimed is:

1. A braking force distribution control system for a vehicle having front and rear wheels, comprising:

a front wheel brake for exhibiting a braking force corresponding to a braking liquid pressure;

a rear wheel brake for exhibiting a braking force corresponding to a braking liquid pressure;

a front wheel rotational speed sensor for detecting a front wheel rotational speed;

a rear wheel rotational speed sensor for detecting a rear wheel rotational speed;

a front wheel speed calculating means for calculating a front wheel speed based on the front wheel rotational speed detected by said front wheel rotational speed sensor and based on a front wheel diameter;

a rear wheel speed calculating means for calculating a rear wheel speed based on the rear wheel rotational speed detected by said rear wheel rotational speed sensor and based on a rear wheel diameter;

braking pressure regulating means for regulating a ratio of the braking liquid pressure for the front and rear wheels;

control quantity calculating means for calculating a control quantity for the braking pressure regulating means based on comparison of the front and rear wheel speeds calculated in said front and rear wheel speed calculating means;

correcting-factor calculating means for calculation a correcting factor corresponding to a difference between a preset wheel diameter and an actual wheel diameter, based on a ratio of the front and rear wheel rotational speeds detected by said front and rear wheel rotational speed sensors;

wheel speed correcting means for correcting at least one of the front and rear wheel speeds calculated by said front and rear wheel speed calculating means prior to the calculation of the control quantity by said control quantity calculating means; and control determining means for determining whether a range of variation in the correcting factor calculated by said correcting factor calculating means is equal to or larger than a preset value, and for outputting a signal indicative of a command to prohibit the calculation of the control quantity based on comparison of the front and rear wheel speeds in said control quantity calculating means when the range of variation in the correcting factor is equal to or larger than the preset value.

2. A braking-force distribution control system for a vehicle according to claim 1, wherein said correcting factor calculating means averages the correcting factors which have been calculated a predetermined number of times under a condition in which the vehicle is in a stable traveling state, and outputs the averaged value, and said control determining means determines whether the range of variation in the correcting factor is equal to or larger than the preset value, based on comparison of a last correcting factor output from said correcting factor calculating means with a current correcting factor output from said correcting factor calculating means.

3. A braking-force distribution control system for a vehicle according to claim 1, wherein said control quantity calculating means calculates the control quantity such that the breaking liquid pressure ratio is provided, depending upon the braking liquid pressure for the front wheel brake, under a condition in which the calculation of the control quantity based on comparison of the front and rear wheel speeds has been prohibited in response to a signal input from said control determining means.

4. A braking-force distribution control system for a vehicle according to claim 1, wherein said control quantity calculating means calculates the control quantity such that the braking liquid pressure ratio is provided depending upon a deceleration of the vehicle under a condition in which the calculation of the control quantity based on comparison of the front and rear wheel speeds has been prohibited in response to a signal input from said control determining means.

* * * * *